US010298305B2

(12) United States Patent
Lau et al.

(10) Patent No.: US 10,298,305 B2
(45) Date of Patent: May 21, 2019

(54) CHANNEL STATE INFORMATION FEEDBACK METHOD AND APPARATUS, USER EQUIPMENT, AND BASE STATION

(71) Applicant: Huawei Technologies Co., Ltd., Shenzhen (CN)

(72) Inventors: Kin Nang Lau, Hong Kong (HK); Xiongbin Rao, Hong Kong (HK); Rongdao Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 236 days.

(21) Appl. No.: 15/242,207

(22) Filed: Aug. 19, 2016

(65) Prior Publication Data

US 2016/0365913 A1    Dec. 15, 2016

Related U.S. Application Data

(63) Continuation of application No. PCT/CN2014/072247, filed on Feb. 19, 2014.

(51) Int. Cl.
*H04B 7/06* (2006.01)
*H04L 1/00* (2006.01)
*H04L 5/00* (2006.01)

(52) U.S. Cl.
CPC ......... *H04B 7/0626* (2013.01); *H04L 1/0026* (2013.01); *H04L 1/0029* (2013.01); *H04L 5/0048* (2013.01)

(58) Field of Classification Search
None
See application file for complete search history.

(56) References Cited

U.S. PATENT DOCUMENTS 8,023,457 B2    9/2011    Kotecha et al.
8,995,369 B2    3/2015    Li et al.
(Continued)

FOREIGN PATENT DOCUMENTS

CN    102104452 A    6/2011
CN    102263613 A    11/2011
(Continued)

OTHER PUBLICATIONS

"5G: A Technology Vision," pp. i-14, Huawei Publications, Shenzhen, China (2014).

(Continued)

*Primary Examiner* — James P Duffy
(74) *Attorney, Agent, or Firm* — Leydig, Voit & Mayer, Ltd.

(57) ABSTRACT

Embodiments of the present invention provide a channel state information (CSI) feedback method and apparatus, user equipment, and a base station. The method, performed by a user equipment device, includes: pre-synchronizing, between the user equipment device and a base station, a basis matrix that includes sparsity of CSI in a frequency domain and a space domain; receiving pilot information from the base station; determining, according to the pilot information, a CSI information matrix that includes information about the frequency domain and the space domain of CSI; determining the data by using the CSI information matrix; and feeding back the data to the base station, so that the base station restores the corresponding CSI information from the data by using the basis matrix.

10 Claims, 10 Drawing Sheets

(56) References Cited

U.S. PATENT DOCUMENTS

| | | | |
|---|---|---|---|
| 9,337,871 | B2 | 5/2016 | Li et al. |
| 2007/0064823 | A1 | 3/2007 | Hwang et al. |
| 2008/0080449 | A1 | 4/2008 | Huang et al. |
| 2008/0080459 | A1 | 4/2008 | Kotecha et al. |
| 2009/0047999 | A1* | 2/2009 | Xia .................. H04B 7/0417 455/562.1 |
| 2012/0014272 | A1 | 1/2012 | Zhou et al. |
| 2013/0163645 | A1* | 6/2013 | Kuo .................. H04B 7/0663 375/219 |

FOREIGN PATENT DOCUMENTS

| | | |
|---|---|---|
| CN | 103825669 A | 5/2014 |
| EP | 2159978 A1 | 3/2010 |

OTHER PUBLICATIONS

Banister et al., "A Simple Gradient Sign Algorithm for Transmit Antenna Weight Adaption with Feedback," IEEE Transactions on Signal Processing, vol. 51, Issue 5, pp. 1156-1171, Institute of Electrical and Electronics Engineers, New York, New York (May 2003).

Baraniuk et al., "An Introduction to Compressive Sensing," pp. i-112, OpenStax-CNX (2011).

Mondal et al., "Channel Adaptive Quantization for Limited Feedback MIMO Beamforming Systems," IEEE Transactions on Signal Processing, vol. 54, Issue 12, pp. 4717-4729, Institute of Electrical and Electronics Engineers, New York, New York (Dec. 2006).

Needell et al., "CoSaMP: Iterative signal recovery from incomplete and inaccurate samples," Applied and Computational Harmonic Analysis, vol. 26, pp. 301-321, Elsevier Inc. (2009).

Xia et al., "Design and Analysis of Transmit-Beamforming based on Limited-Rate Feedback," IEEE Transactions on Signal Processing, vol. 54, Issue 5, pp. 1853-1863, Institute of Electrical and Electronics Engineers, New York, New York (May 2006).

Nguyen et al., "Feedback Compression Schemes for Downlink Carrier Aggregation in LTE-Advanced," IEEE Vehicular Technology Conference, Institute of Electrical and Electronics Engineers, New York, New York (Sep. 5-8, 2011).

Larsson et al., "Massive MIMO for Next Generation Wireless Systems," IEEE Communications Magazine, pp. 186-195, Institute of Electrical and Electronics Engineers, New York, New York, (Feb. 2014).

Li et al., "Novel Scheme of CSI Feedback Compression for Multi-User MIMO-OFDM System," International Workshop on Information and Electronics Engineering (IWIEE), vol. 29, pp. 3631-3635, Elsevier Inc (2012).

* cited by examiner

CHANNEL STATE INFORMATION FEEDBACK METHOD AND APPARATUS, USER EQUIPMENT, AND BASE STATION

CROSS-REFERENCE TO RELATED APPLICATIONS

This application is a continuation of International Application No. PCT/CN2014/072247, filed on Feb. 19, 2014, which is hereby incorporated by reference in its entirety.

TECHNICAL FIELD

Embodiments of the present invention relate to the field of wireless communication technologies, and more specifically, to a channel state information (CSI) feedback method and apparatus, user equipment, and a base station.

BACKGROUND

In a wireless communications system, a large-scale antenna array can bring space domain multiplexing gains, so as to improve communication throughput of the wireless system. Therefore, large-scale antenna arrays are considered as a key technology of future wireless communications systems. However, in order to obtain the space domain multiplexing gains brought by multiple antennas, a base station in the wireless system needs to learn channel state information (CSI) of a channel between a transmitting antenna of a base station to a receiving antenna of a user equipment (UE) device. CSI represents information about channel attenuation from the base station to the UE, and is fed back, after being measured and calculated by the UE, to the base station by using an uplink feedback link.

As a quantity of antennas in a large-scale antenna array increases, an amount of information about CSI that is feedback from the UE to the base station greatly increases, so that a large number of feedback overheads are brought to the entire wireless communications system. The large number of feedback overheads offset a benefit of a diversity gain brought by the large-scale antenna array, and reduce actually effective frequency spectrum utilization. In another aspect, a limited feedback method is generally used in an actual wireless communications system, that is, a feedback capacity of an uplink feedback link is given. As an amount of CSI information that needs to be fed back continuously increases, a quantity of bits that can be assigned for each piece of CSI gradually decreases; then, quality of CSI fed back to the base station from the UE gradually decreases. Therefore, CSI feedback efficiency needs to be improved, so as to ensure the quality of CSI fed back to the base station and improve spectrum utilization of the wireless communications systems.

A conventional CSI feedback method of an existing wireless communications system includes: UE uses pilots sent by a base station to measure and calculate a CSI parameter corresponding to a subcarrier, and the UE quantizes the entire CSI parameter by using a codebook; afterwards, the quantized CSI parameter is fed back to the base station through an uplink from the UE to the base station, and the base station figures out the corresponding CSI parameter by using the same codebook.

Therefore, in the existing CSI feedback manner, characteristics of CSI in a large-scale antenna array are not considered, and CSI feedback efficiency is relatively low.

SUMMARY

In view of this, embodiments of the present invention provide a channel state information (CSI) feedback method and apparatus, user equipment, and a base station, so as to resolve a problem of relatively low CSI feedback efficiency brought by no consideration of a characteristic of CSI in a large-scale antenna array in an existing CSI feedback manner.

To achieve the foregoing objective, the following technical solutions are provided in the embodiments of the present invention:

According to a first aspect, an embodiment of the present invention provides a channel state information feedback method, where a basis matrix that includes sparsity of CSI in a frequency domain and a space domain is pre-synchronized with a base station, and the method includes:

receiving pilot information from the base station;

determining, according to the pilot information, a CSI information matrix that includes information about the frequency domain and the space domain of CSI;

determining data by using the CSI information matrix; and feeding back the data to the base station, so that the base station restores the corresponding CSI information from the data by using a basis matrix that is pre-synchronized with UE and includes the sparsity of the CSI in the frequency domain and the space domain.

With reference to the first aspect, in a first possible implementation manner of the first aspect, a process in which a basis matrix that includes sparsity of CSI in a frequency domain and a space domain is pre-synchronized with a base station includes:

receiving a training sequence, of a period of time, from the base station;

measuring and calculating a corresponding CSI channel matrix sequence according to the training sequence, where each CSI channel matrix in the measured and calculated CSI channel matrix sequence is a matrix that includes information about a frequency domain and a space domain of CSI;

if an initialized basis matrix is given, calculating a sparse vector sequence corresponding to a sequence including column vectors corresponding to each CSI channel matrix;

determining, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition; and synchronizing, to the base station, the determined basis matrix that includes the sparsity of the CSI in the frequency domain and the space domain.

According to a second aspect, an embodiment of the present invention provides a channel state information feedback apparatus, where the apparatus includes:

a first synchronizing module, configured to pre-synchronize, with a base station base station, a basis matrix that includes sparsity of channel state information CSI in a frequency domain and a space domain;

a pilot information receiving module, configured to receive pilot information from the base station;

a CSI information matrix determining module, configured to determine, according to the pilot information, a CSI information matrix that includes information about the frequency domain and the space domain of CSI;

a data determining module, configured to determine data by using the CSI information matrix; and a feedback module, configured to feed back the data to the base station, so that the base station restores the corresponding CSI information from the data by using the basis matrix that is pre-synchronized with UE and includes the sparsity of the CSI in the frequency domain and the space domain.

With reference to the second aspect, in a first possible implementation manner of the second aspect, the first synchronizing module includes:

a training sequence receiving unit, configured to receive a training sequence, of a period of time, from the base station;

a measuring and calculating unit, configured to measure and calculate a corresponding CSI channel matrix sequence according to the training sequence, where each CSI channel matrix in the measured and calculated CSI channel matrix sequence is a matrix that includes information about a frequency domain and a space domain of CSI;

a sparse vector sequence calculation unit, configured to: if an initialized basis matrix is given, calculate a sparse vector sequence corresponding to a sequence including column vectors corresponding to each CSI channel matrix;

a basis matrix determining unit, configured to determine, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition; and a basis matrix sending unit, configured to synchronize, to the base station, the determined basis matrix that includes the sparsity of the CSI in the frequency domain and the space domain.

According to a third aspect, an embodiment of the present invention provides user equipment, including the channel state information feedback apparatus described above.

According to a fourth aspect, an embodiment of the present invention provides a channel state information feedback method, where a basis matrix that includes sparsity of CSI in a frequency domain and a space domain is pre-synchronized with UE, and the method includes:

sending pilot information to the UE;

after the UE determines, according to the pilot information, a CSI information matrix that includes information about the frequency domain and the space domain of CSI, and determines data by using the CSI information matrix, receiving the data fed back by the UE; and restoring the corresponding CSI information from the data by using the basis matrix that is pre-synchronized with the UE and includes the sparsity of the CSI in the frequency domain and the space domain.

With reference to the fourth aspect, in a first possible implementation manner of the fourth aspect, a process in which a basis matrix that includes sparsity of CSI in a frequency domain and a space domain is pre-synchronized with UE includes:

sending a training sequence of a period of time to the UE;

after a procedure in which the UE measures and calculates a corresponding CSI channel matrix sequence according to the training sequence, where each CSI channel matrix in the measured and calculated CSI channel matrix sequence is a matrix that includes information about a frequency domain and a space domain of CSI; and if an initialized basis matrix is given, the UE calculates a sparse vector sequence corresponding to a sequence including column vectors corresponding to each CSI channel matrix, and determines, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition, receiving the basis matrix that is synchronized by the UE and includes the sparsity of the CSI in the frequency domain and the space domain.

According to a fifth aspect, an embodiment of the present invention provides a channel state information feedback apparatus, including:

a second synchronizing module, configured to pre-synchronize, with user equipment UE, a basis matrix that includes sparsity of channel state information CSI in a frequency domain and a space domain;

a pilot information sending module, configured to send pilot information to the UE;

a data receiving module, configured to: after the UE determines, according to the pilot information, a CSI information matrix that includes information about the frequency domain and the space domain of CSI, and determines data by using the CSI information matrix, receive the data fed back by the UE; and a restoration processing module, configured to restore the corresponding CSI information from the data by using the basis matrix that is pre-synchronized with the UE and includes the sparsity of the CSI in the frequency domain and the space domain.

With reference to the fifth aspect, in a first possible implementation manner of the fifth aspect, the second synchronizing module includes:

a training sequence sending unit, configured to send a training sequence of a period of time to the UE; and a basis matrix receiving unit, configured to: after a procedure in which the UE measures and calculates a corresponding CSI channel matrix sequence according to the training sequence, where each CSI channel matrix in the measured and calculated CSI channel matrix sequence is a matrix that includes information about a frequency domain and a space domain of CSI; and if an initialized basis matrix is given, the UE calculates a sparse vector sequence corresponding to a sequence including column vectors corresponding to each CSI channel matrix, and determines, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition, receive the basis matrix that is synchronized by the UE and includes the sparsity of the CSI in the frequency domain and the space domain.

According to a sixth aspect, an embodiment of the present invention provides a base station, including the channel state information feedback apparatus described above.

Based on the foregoing technological solutions, in the channel state information feedback method provided in the embodiments of the present invention, a characteristic of sparsity of CSI in a frequency domain and a space domain in a large-scale antenna communications system is used. A CSI information matrix that includes information about the frequency domain and the space domain of CSI is determined by using pilot information received from a base station. Data is determined by using the CSI information matrix. After the data is fed back to the base station, the base station may restore the corresponding CSI information from the data by using a basis matrix that is pre-synchronized with UE and includes the sparsity of the CSI in the frequency domain and the space domain, thereby implementing CSI feedback. Compared with the prior art, in the embodiments of the present invention, the CSI feedback is implemented by using a characteristic of the sparsity of the CSI in the frequency domain and the space domain in the large-scale antenna communications system, which resolves a problem of relatively low CSI feedback efficiency brought by no consideration of a characteristic of CSI in a large-scale antenna array in the prior art, improves CSI feedback efficiency, reduces feedback overheads from a UE to a base station, and further improves spectrum utilization in wireless communications.

BRIEF DESCRIPTION OF DRAWINGS

The following briefly introduces the accompanying drawings used in describing the embodiments of the present invention.

DETAILED DESCRIPTION OF EMBODIMENTS

In a in a wireless communications system, there are limited amount of scattering objects in a channel from a base station to UE. Therefore, a space domain path from the base station to the UE is limited. When a quantity of antennas increases to a certain amount, there is a characteristic of sparsity for CSI from the base station to the UE. That is, in an M*N CSI space domain matrix (M represents a quantity of receiver antennas of the UE, and N represents a quantity of transmitter antennas of the base station), not every element has a degree of freedom, and these elements in a domain are associated with each other and have a limited total quantity of degrees of freedom. In wireless space, spatial scattering objects from the base station to the user is limited; as a quantity of antennas increases, CSI features sparsity in a space domain, which shows that CSI elements in the space domain are associated with each other.

In addition, in a multiple-input multiple-output-orthogonal frequency division multiplexing (MIMO-OFDM) system for wireless communications, because only limited multiple paths are provided in a transmission environment, a channel impulsion response from a transmit antenna of a base station to a receive antenna of UE generally shows a particular characteristic of sparsity. When reflected on CSI of MIMO-OFDM, such a characteristic of sparsity shows that CSI on different subcarriers are associated with each other. That is, CSI elements in a frequency domain are associated with each other.

It can be learned that in a wireless communications system using large-scale antennas, CSI has sparsity in a space domain and a time domain. Therefore, in a CSI feedback process, sparsity of CSI in a frequency domain and a space domain in a large-scale antenna network is used, which can greatly improve CSI feedback efficiency.

Based on the foregoing ideas, the following describes a channel state information feedback method and apparatus, user equipment, and a base station that are provided in the embodiments of the present invention.

Figure 1:
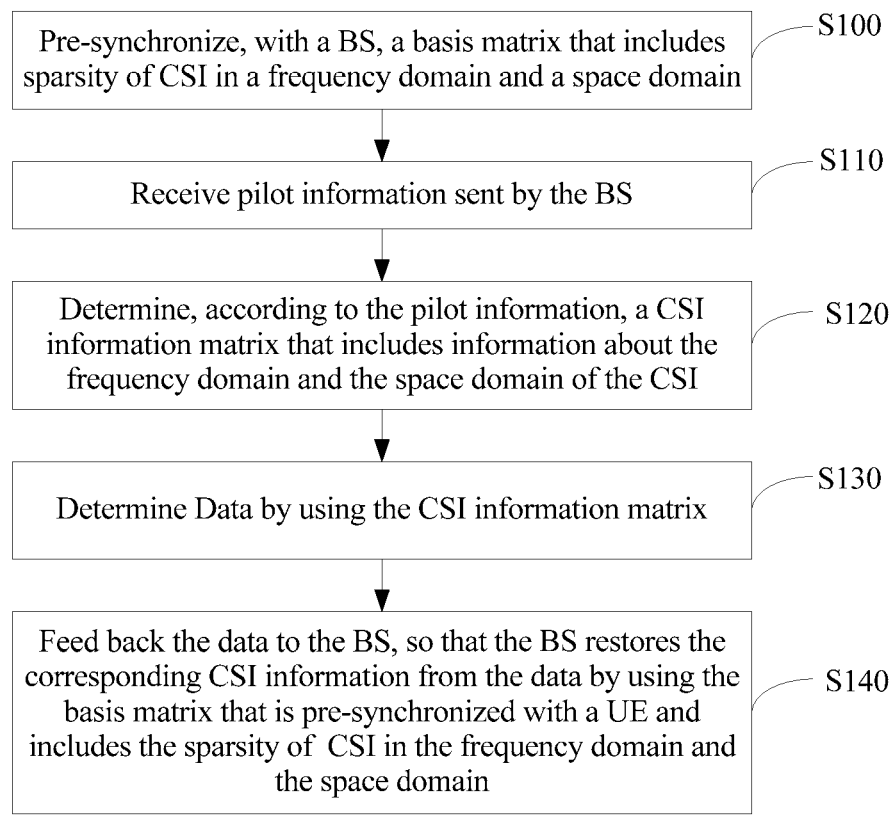
FIG. 1 is a flowchart of a channel state information feedback method according to an embodiment of the present invention.

The following describes a channel state information feedback method provided in an embodiment of the present invention from a perspective of UE. FIG. 1 is a flowchart of a channel state information feedback method according to this embodiment of the present invention. The method may be applied to a UE side. Referring to FIG. 1, the method may include the following steps:

Step S100: Pre-synchronize, with a base station (BS), a basis matrix that includes sparsity of channel state information CSI in a frequency domain and a space domain.

B may be set as a basis matrix of sparsity of CSI, where the basis matrix B of the sparsity of the CSI reflects a characteristic of sparsity in a frequency domain and a space domain, which represents that the CSI expressed by the basis matrix is sparse (there are only limited nonzero elements).

Step S110: Receive pilot information from the base station.

Step S120: Determine, according to the pilot information, a CSI information matrix that includes information about the frequency domain and the space domain of CSI.

The CSI information matrix may be set to H, where the CSI information matrix H represents a matrix that is corresponding to the CSI and includes the information about the frequency domain and the space domain. Optionally, in this embodiment of the present invention, the CSI information matrix that includes the information about the frequency domain and the space domain of CSI may be determined according to the pilot information by using a commonly used channel estimation method. A person skilled in the art may know multiple commonly used methods for determining, according to the pilot information, the CSI information matrix that includes the information about the frequency domain and the space domain of CSI. These commonly used methods are known technologies in the communications field, and details are not described herein again. However, it should be noted that all these commonly used methods for determining, according to the pilot information, the CSI information matrix that includes the information about the frequency domain and the space domain of CSI shall fall within the protection scope, of determining, according to the pilot information, the CSI information matrix that includes the information about the frequency domain and the space domain of CSI, required by this embodiment of the present invention.

Step S130: Determine data by using the CSI information matrix.

In this embodiment of the present invention, compressive sensing processing may be performed on the CSI information matrix H to obtain the data; or after compressive sensing processing is performed on the CSI information matrix H, block quantization may be performed on a CSI information matrix obtained after the compressive sensing processing to obtain the data.

Step S140: Feed back the data to the base station, so that the base station restores the corresponding CSI information from the data by using the basis matrix that is pre-synchronized with the UE and includes the sparsity of the CSI in the frequency domain and the space domain.

After the data is fed back to the base station, the base station may restore the CSI information from the data by using the basis matrix B of the sparsity of the CSI, so as to complete CSI feedback.

It should be noted that step S100 is a step performed in advance, and after step S100 is performed once, step S110 to step S140 may be performed for multiple times.

In the channel state information feedback method provided in this embodiment of the present invention, a characteristic of sparsity of CSI in a frequency domain and a space domain in a large-scale antenna communications system is used; a CSI information matrix that includes information about the frequency domain and the space domain of CSI is determined by using pilot information sent by a base station; data is determined by using the CSI information matrix; after the data is fed back to the base station, the base station may restore the corresponding CSI information from the data by using a basis matrix that is pre-synchronized with UE and includes the sparsity of the CSI in the frequency domain and the space domain, thereby implementing CSI feedback. Compared with the prior art, in this embodiment of the present invention, the CSI feedback is implemented by using a characteristic of the sparsity of the CSI in the frequency domain and the space domain in the large-scale antenna communications system, which resolves a problem of relatively low CSI feedback efficiency brought by no consideration of a characteristic of CSI in a large-scale antenna array in the prior art, improves the CSI feedback efficiency, reduces feedback overheads from a UE to a base station, and further improves spectrum utilization in wireless communications.

Figure 2:
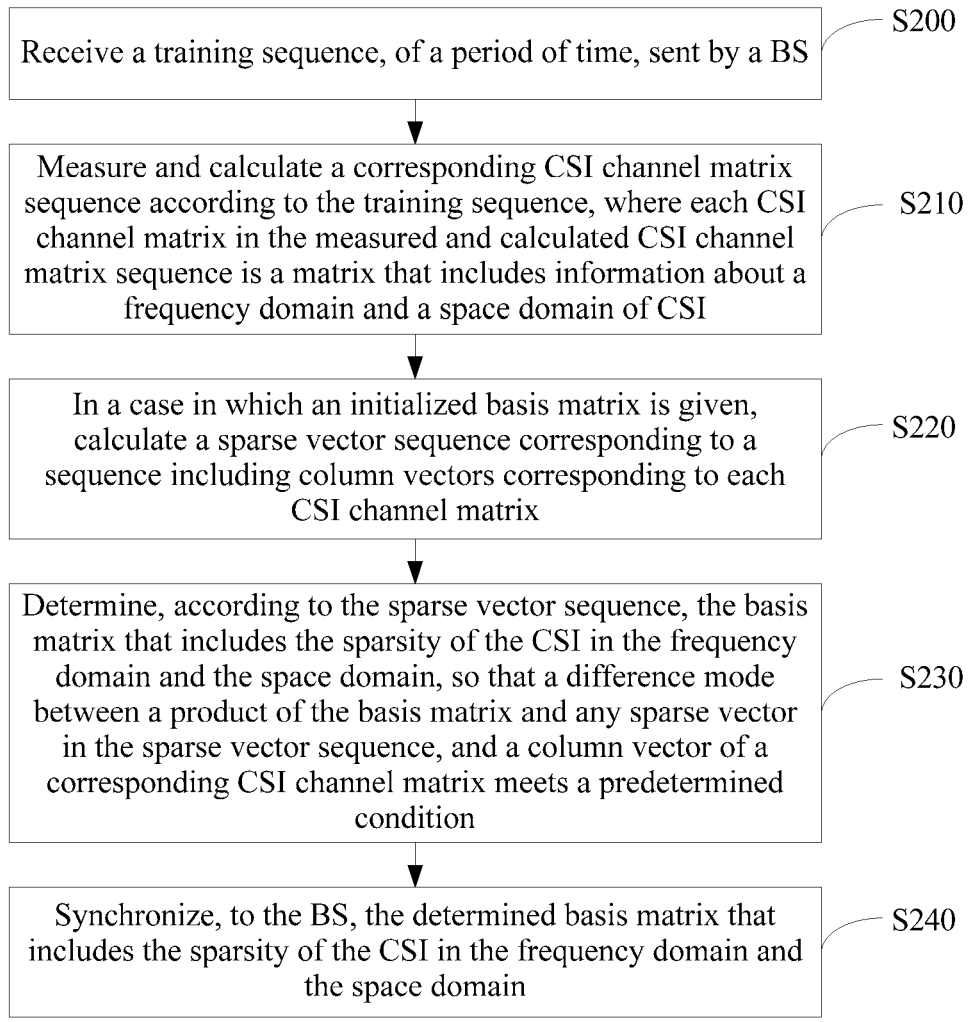
FIG. 2 is a flowchart of a method for pre-synchronizing, with a base station, a basis matrix that includes sparsity of CSI in a frequency domain and a space domain according to an embodiment of the present invention.

The following describes a process in which the basis matrix that includes the sparsity of the CSI in the frequency domain and the space domain is pre-synchronized. A process in which the basis matrix B of the sparsity of the CSI is pre-synchronized may be considered as a process in which the UE trains the basis matrix B of the sparsity of the CSI. Correspondingly, FIG. 2 shows a flowchart of a method for pre-synchronizing with the base station, the basis matrix that includes the sparsity of the CSI in the frequency domain and the space domain. Referring to FIG. 2, the method may include the following steps:

Step S200: Receive a training sequence, of a period of time, from the base station.

The base station may send a training sequence of a period of time $\{t=1, K\ T\}$ to the UE.

Step S210: Measure and calculate a corresponding CSI channel matrix sequence according to the training sequence, where each CSI channel matrix in the measured and calculated CSI channel matrix sequence is a matrix that includes information about a frequency domain and a space domain of CSI.

After the UE receives the training sequence of $\{t=1, K\ T\}$ a corresponding CSI channel matrix $\{H_1, K\ H_T\}$ may be measured and calculated, where each CSI matrix $H_t$ (t=1~7) represents a large matrix that includes information about a frequency domain and a space domain.

Optionally, $H_t$ may be expressed as $$H_t = [\text{vec}(H_t^{[1]}) K \text{vec}(H_t^{[Nc]})]\ W_{N_c},$$

where $N_c$ is a total quantity of MIMO-OFDM subcarriers, $H_t^{[c]}$ represents CSI information (N×M matrix) on the $c^{th}$ subcarrier, and $W_{N_c}$ is a fast fourier transform (FFT) matrix of an $N_c$ level, where Vec(.) is a standard operator, that is, elements in a matrix are lined up into a column vector according to a column direction.

Step S220: If an initialized basis matrix is given, calculate a sparse vector sequence corresponding to a sequence including column vectors corresponding to each CSI channel matrix.

Optionally, if an initialized basis matrix $B_{initial}$, is given, a sparse vector $\{s_1, K\ s_T\}$ corresponding to $\{\text{vec}\ (H_1), K\ \text{vec}(H_T)\}$ may be calculated by using a CoSaMP algorithm, that is, $s_t = \text{CoSaMP}(\text{vec}(H_t), I, B_{initial}, s_0)\ \forall t \in \{1KT\}$, where I is an identity matrix, and a sparse vector $s_t$ (t=1~T) represents a vector that has only $s_0$ nonzero elements (it should be noted that $s_0$ represents a sparsity degree of CSI, and needs to be given in advance), and a relationship between vec ($H_t$) and $s_t$ is that vec ($H_t$) may be approximately expressed as vec($H_t$)≈$B_{initial}\ s_t$. In this embodiment of the present invention, the vector $s_t$ that has only $s_0$ nonzero elements may be generated by using the CoSaMP algorithm, so that $B_{initial}\ s_t$ comes as close as possible to vec ($H_t$).

Step S230: Determine, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition.

Optionally, the differential mode may be the smallest when the differential mode meets the predetermined condition; apparently, the predetermined condition may also be set according to an actual application situation. In this embodiment of the present invention, after $\{s_1, K\ s_T\}$ is obtained, the corresponding basis matrix B of the sparsity of the CSI may be calculated by using a convex optimization tool and by resolving the following optimization problem: $\min_{diag\ (B+B) \leq 1} \Sigma_{i=1}^{T} \|vec\ (H_t) - Bs_t\|^2$, where $Bs_t$ is two parameter values, and B represents a basis matrix, and t is a corresponding sparse vector. An objective of this optimization problem is to search for the basis matrix B of the sparsity of the CSI under a condition that the sparse vector $\{s_1, K\ s_T\}$ is given, so that a differential mode between vec $(H_t)$ and $Bs_t$ is minimized.

Optionally, alternate calculation may be performed between step S220 and step S230 to obtain an ultimate B. In an alternate calculation process, $\{s_1, K\ s_T\}$ output in step S220 is an input parameter of an optimization problem in step S230, and B output from the optimization problem in step S230 may be an input parameter of a problem in step S220.

Step S240: Synchronize, to the base station, the determined basis matrix that includes the sparsity of the CSI in the frequency domain and the space domain.

Figure 3:
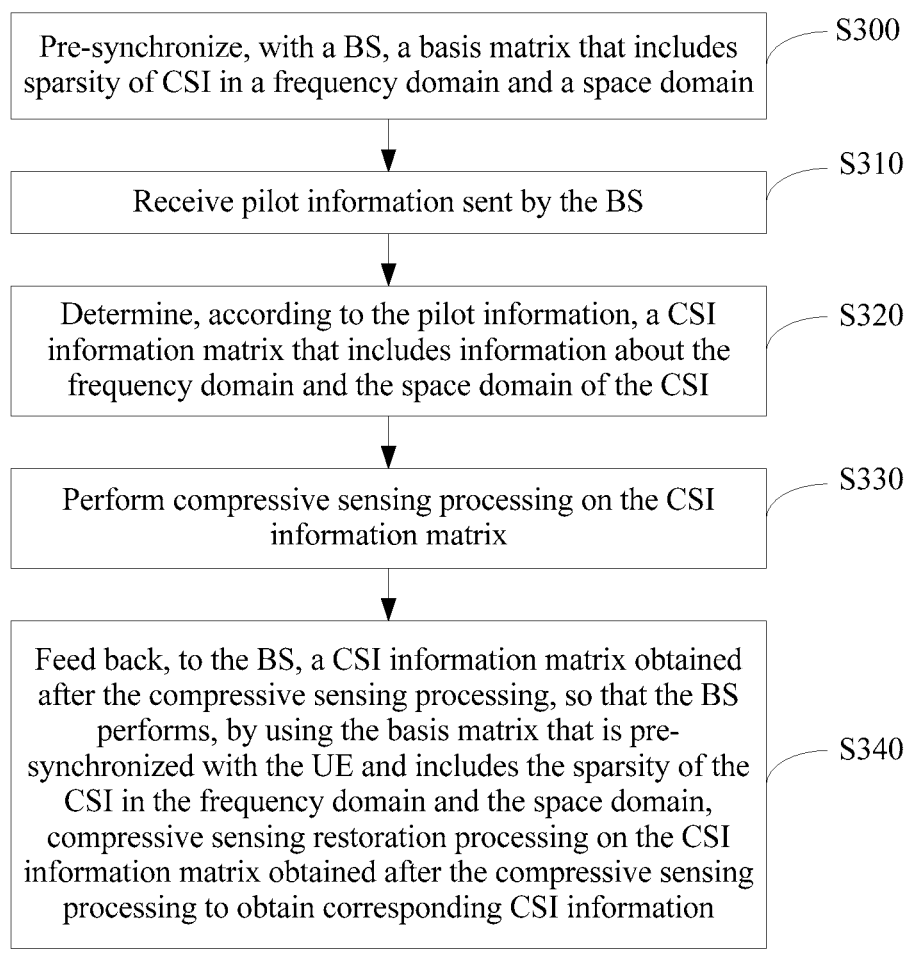
FIG. 3 is flowchart of a channel state information feedback method according to another embodiment of the present invention.

Optionally, a manner of determining data by using the CSI information matrix in step S130 shown in FIG. 1 may be: performing compressive sensing processing on the CSI information matrix to obtain the data. Correspondingly, FIG. 3 shows another flowchart of a channel state information feedback method according to an embodiment of the present invention. Referring to FIG. 3, the method may include the following steps:

Step S300: Pre-synchronize, with a base station, a basis matrix that includes sparsity of CSI in a frequency domain and a space domain.

Step S310: Receive pilot information from the base station.

Step S320: Determine, according to the pilot information, a CSI information matrix that includes information about the frequency domain and the space domain of CSI.

Step S330: Perform compressive sensing processing on the CSI information matrix.

Optionally, $y=\Phi vec(H)$ is obtained by using a CSI information matrix H obtained after compression of a compressive sensing matrix, where $\Phi$ is the compressive sensing matrix, and y is the CSI information matrix obtained after the compressive sensing processing.

Step S340: Feed back, to the base station, a CSI information matrix obtained after the compressive sensing processing, so that the base station performs, by using the basis matrix that is pre-synchronized with the UE and includes the sparsity of the CSI in the frequency domain and the space domain, compressive sensing restoration processing on the CSI information matrix obtained after the compressive sensing processing to obtain corresponding CSI information.

It should be noted that step S300 is a step performed in advance, and after step S300 is performed once, step S310 to step S340 may be performed for multiple times.

Figure 4:
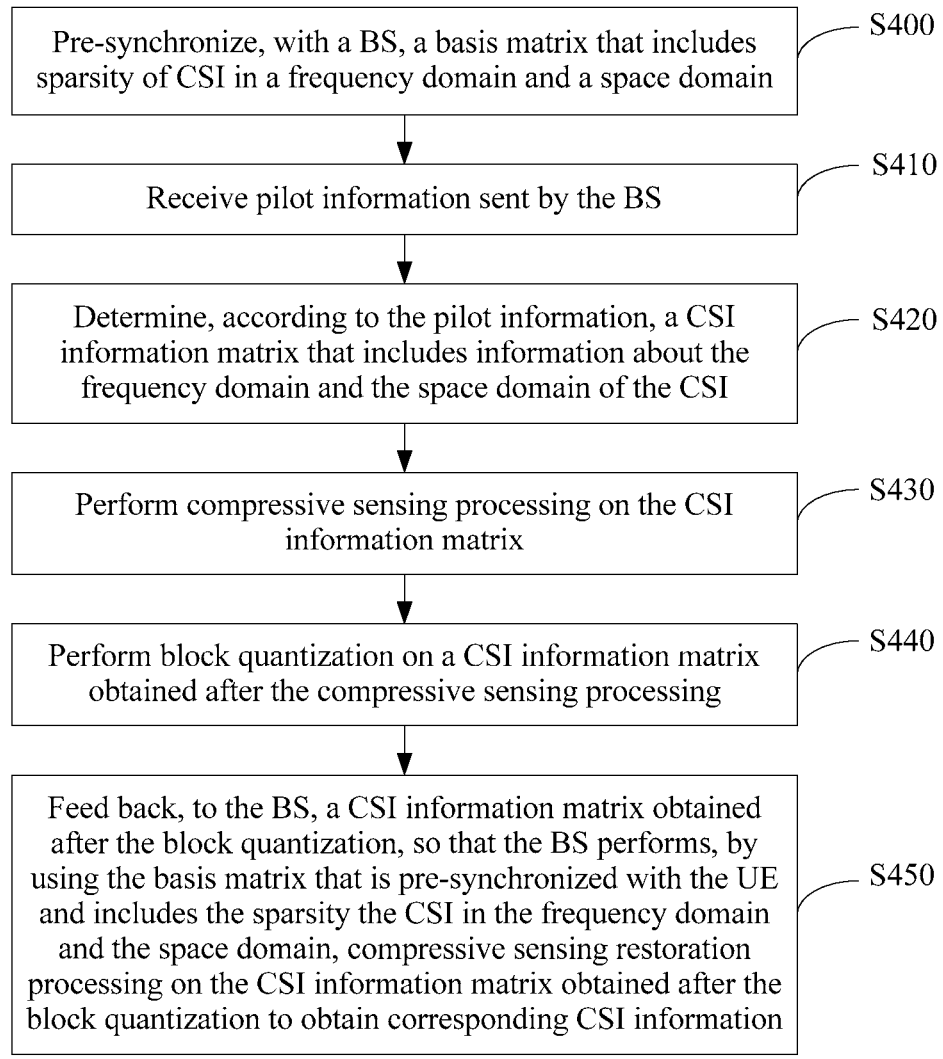
FIG. 4 is a flowchart of a channel state information feedback method according to still another embodiment of the present invention.

Optionally, a manner of determining data by using the CSI information matrix in step S130 shown in FIG. 1 may be: performing compressive sensing processing on the CSI information matrix, and performing block quantization on a CSI information matrix obtained after the compressive sensing processing to obtain the data. Correspondingly, FIG. 4 shows still another flowchart of a channel state information feedback method according to an embodiment of the present invention. Referring to FIG. 4, the method may include the following steps:

Step S400: Pre-synchronize, with a base station, a basis matrix that includes sparsity of CSI in a frequency domain and a space domain.

Step S410: Receive pilot information from the base station.

Step S420: Determine, according to the pilot information, a CSI information matrix that includes information about the frequency domain and the space domain of CSI.

Step S430: Perform compressive sensing processing on the CSI information matrix.

Optionally, $y\Phi vec(H)$ is obtained by using a CSI information matrix H obtained after compression of a compressive sensing matrix.

Step S440: Perform block quantization on a CSI information matrix obtained after the compressive sensing processing.

Optionally, a process of the block quantization may be: performing block processing, by using a predetermined length, on the CSI information matrix obtained after the compressive sensing processing; quantizing, by using a codebook with a predetermined dimension, each block of the CSI information matrix obtained after the compressive sensing processing.

For example, block quantization may be performed on a vector y, and a size of each block is L, that is, $$y = [\underbrace{y_1 \cdots y_L}_{y[1]}\ \underbrace{y_{L+1} \cdots y_{2L}}_{y[2]}\ \cdots\ ]^T;$$

afterwards, each y[l] is quantized by using a codebook with a dimension of L, and it is assumed that quantized Y is ŷ.

Step S450: Feed back, to the base station, a CSI information matrix obtained after the block quantization, so that the base station performs, by using the basis matrix that is pre-synchronized with the UE and includes the sparsity of the CSI in the frequency domain and the space domain, compressive sensing restoration processing on the CSI information matrix obtained after the block quantization to obtain corresponding CSI information.

It should be noted that step S400 is a step performed in advance, and after step S400 is performed once, step S410 to step S450 may be performed for multiple times.

In the channel state information feedback method provided in this embodiment of the present invention, a characteristic of sparsity of CSI in a frequency domain and a space domain in a large-scale antenna communications system is used, which improves CSI feedback efficiency, reduces feedback overheads from a UE to a base station, and further improves spectrum utilization in wireless communications.

The following describes a channel state information feedback apparatus provided in an embodiment of the present invention. The channel state information feedback apparatus described in the following is corresponding to the channel state information feedback method described above, and reference may be made to each other.

Figure 5:
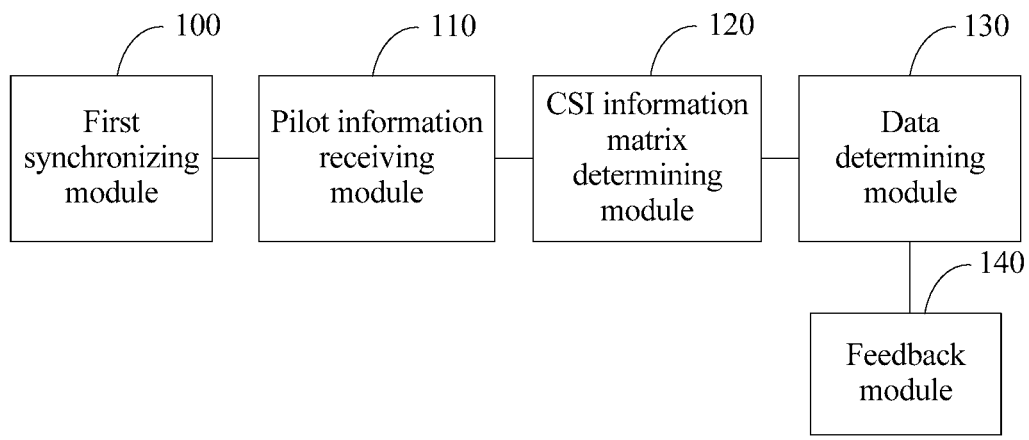
FIG. 5 is a functional block diagram of a channel state information feedback apparatus according to an embodiment of the present invention.

FIG. 5 is a structural block diagram of a channel state information feedback apparatus according to an embodiment of the present invention. The apparatus may be applied to UE. Referring to FIG. 5, the apparatus may include:

a first synchronizing module 100, configured to pre-synchronize, with a base station, a basis matrix that includes sparsity of channel state information CSI in a frequency domain and a space domain;

a pilot information receiving module 110, configured to receive pilot information from the base station;

a CSI information matrix determining module 120, configured to determine, according to the pilot information, a CSI information matrix that includes information about the frequency domain and the space domain of CSI;

a data determining module 130, configured to determine data by using the CSI information matrix; and a feedback module 140, configured to feed back the data to the base station, so that the base station restores the corresponding CSI information from the data by using the basis matrix that is pre-synchronized with the UE and includes the sparsity of the CSI in the frequency domain and the space domain.

Figure 6:
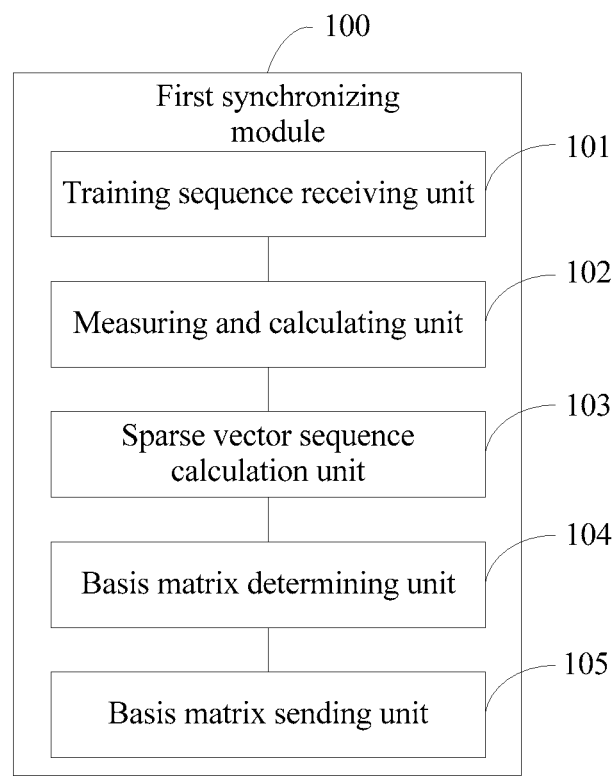
FIG. 6 is a functional block diagram of a first synchronizing module according to an embodiment of the present invention.

FIG. 6 shows an optional structure of the first synchronizing module 100. Referring to FIG. 6, the first synchronizing module 100 may include:

a training sequence receiving unit 101, configured to receive a training sequence, of a period of time, from the base station;

a measuring and calculating unit 102, configured to measure and calculate a corresponding CSI channel matrix sequence according to the training sequence, where each CSI channel matrix in the measured and calculated CSI channel matrix sequence is a matrix that includes information about a frequency domain and a space domain of CSI;

a sparse vector sequence calculation unit 103, configured to: if an initialized basis matrix is given, calculate a sparse vector sequence corresponding to a sequence including column vectors corresponding to each CSI channel matrix;

a basis matrix determining unit 104, configured to determine, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition; where optionally, the differential mode may be the smallest when the differential mode meets the predetermined condition; apparently, the predetermined condition may also be set according to an actual application situation; and a basis matrix sending unit 105, configured to synchronize, to the base station, the determined basis matrix that includes the sparsity of the CSI in the frequency domain and the space domain.

Figure 7:
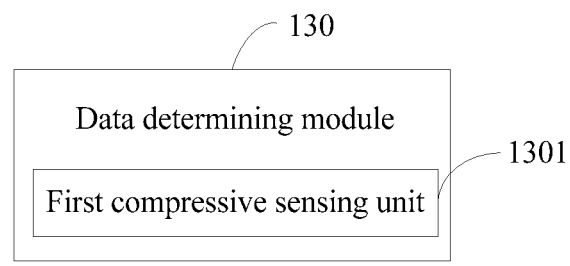
FIG. 7 is a functional block diagram of a data determining module according to an embodiment of the present invention.

FIG. 7 shows an optional structure of the data determining module 130. Referring to FIG. 7, the data determining module 130 may include:

a first compressive sensing unit 1301, configured to perform compressive sensing processing on the CSI information matrix to obtain the data.

Figure 8:
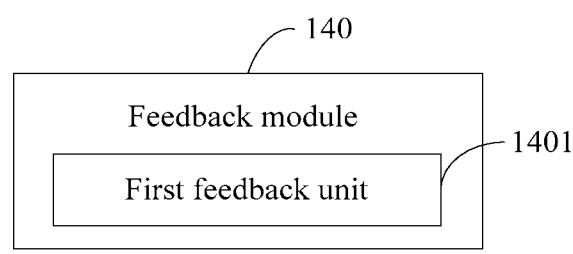
FIG. 8 is a functional block diagram of a feedback module according to an embodiment of the present invention.

Correspondingly, FIG. 8 shows an optional structure of the feedback module 140. Referring to FIG. 8, the feedback module 140 may include:

a first feedback unit 1401, configured to feed back, to the base station, a CSI information matrix obtained after the compressive sensing processing, so that the base station performs, by using the basis matrix that is pre-synchronized with the UE and includes the sparsity of the CSI in the frequency domain and the space domain, compressive sensing restoration processing on the CSI information matrix obtained after the compressive sensing processing to obtain the corresponding CSI information.

Figure 9:
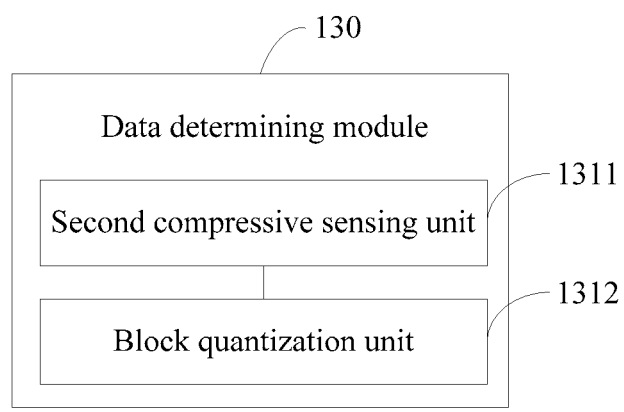
FIG. 9 is another functional block diagram of a data determining module according to an embodiment of the present invention.

FIG. 9 shows another optional structure of the data determining module 130. Referring to FIG. 9, the data determining module 130 may include:

a second compressive sensing unit 1311, configured to perform compressive sensing processing on the CSI information matrix; and a block quantization unit 1312, configured to perform block quantization on a CSI information matrix obtained after the compressive sensing processing to obtain the data.

Figure 10:
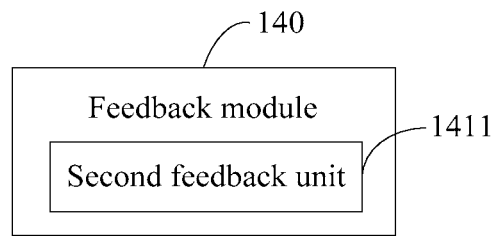
FIG. 10 is another functional block diagram of a feedback module according to an embodiment of the present invention.

Correspondingly, FIG. 10 shows another optional structure of the feedback module 140. Referring to FIG. 10, the feedback module 140 may include:

a second feedback unit 1411, configured to feed back, to the base station, a CSI information matrix obtained after the block quantization, so that the base station performs, by using the basis matrix that is pre-synchronized with the UE and includes the sparsity of the CSI in the frequency domain and the space domain, compressive sensing restoration processing on the CSI information matrix obtained after the block quantization to obtain the corresponding CSI information.

Figure 11:
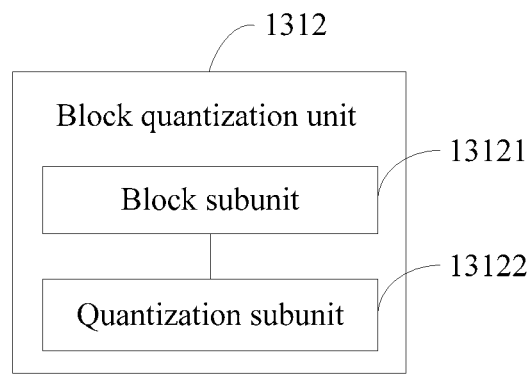
FIG. 11 is a functional block diagram of a block quantization unit according to an embodiment of the present invention.

Correspondingly, FIG. 11 shows an optional structure of the block quantization unit 1312. Referring to FIG. 11, the block quantization unit 1312 may include:

a block subunit 13121, configured to perform, by using a predetermined length, block processing on the CSI information matrix obtained after the compressive sensing processing; and a quantization subunit 13122, configured to quantize, by using a codebook with a predetermined dimension, each block of the CSI information matrix obtained after the compressive sensing processing.

In the channel state information feedback apparatus provided in this embodiment of the present invention, a characteristic of sparsity of CSI in a frequency domain and a space domain in a large-scale antenna communications system is used, which improves CSI feedback efficiency, reduces feedback overheads from a UE to a base station, and further improves spectrum utilization in wireless communications.

An embodiment of the present invention further provides user equipment UE, including the channel state information feedback apparatus described above. For descriptions about the channel state information feedback apparatus, reference may be made to the descriptions in FIG. 5 to FIG. 11, and details are not described herein again.

Figure 12:
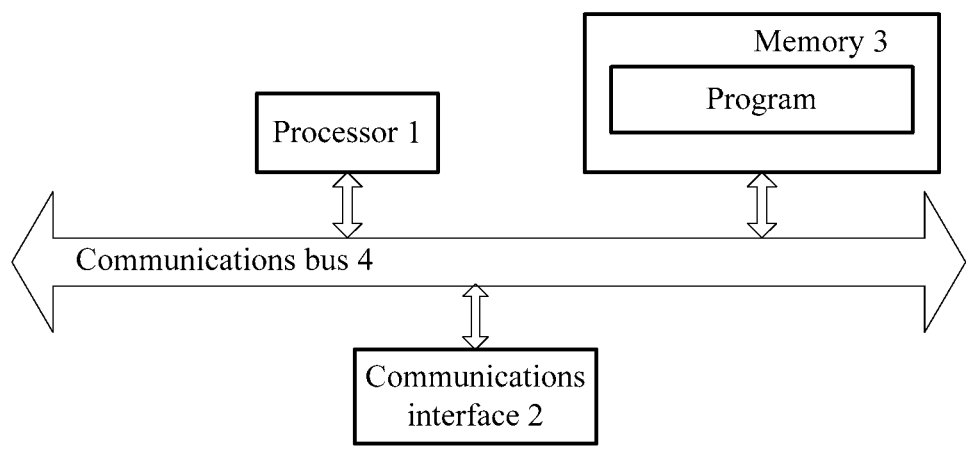
FIG. 12 is a simplified structural block diagram of a user equipment device according to an embodiment of the present invention.

The following describes a hardware structure of user equipment. FIG. 12 shows a structural block diagram of hardware of the user equipment. The user equipment may be an intelligent mobile terminal, such as a mobile phone and a Pad that has a computing capacity. No limitation is imposed on specific implementation of the user equipment in a specific embodiment of the present invention. Referring to FIG. 12, the user equipment may include: a processor 1, a communications interface 2, a memory 3 and a communications bus 4.

The processor 1, the communications interface 2, and the memory 3 conduct mutual communication through the communications bus 4.

Optionally, the communications interface 2 may be an interface of a communication module, for example, an interface of a Global System for Mobile Communications (GSM) module.

The processor 1 is configured to execute a program.

The memory 3 is configured to store the program.

The program may include program code, and the program code includes a computer operation instruction.

The processor 1 may be a central processing unit (CPU), or an application-specific integrated circuit (ASIC), or one or more integrated circuits configured to implement this embodiment of the present invention.

The memory 3 may include a high-speed RAM memory, or may further include a non-volatile memory, for example, at least one disk memory.

The program may be specifically used to:

pre-synchronize, with a base station, a basis matrix that includes sparsity of CSI in a frequency domain and a space domain;

receive pilot information from the base station;

determine, according to the pilot information, a CSI information matrix that includes information about the frequency domain and the space domain of CSI;

determine data by using the CSI information matrix; and feed back the data to the base station, so that the base station restores the corresponding CSI information from the data by using the basis matrix that is pre-synchronized with the UE and includes the sparsity of the CSI in the frequency domain and the space domain.

Optionally, the program may include function modules shown in FIG. 5 to FIG.

The following describes a channel state information feedback method provided in an embodiment of the present invention from a perspective of a base station. Mutual reference may be made between the channel state information feedback method described in the following and channel state information feedback method described in the foregoing from a perspective of UE.

Figure 13:
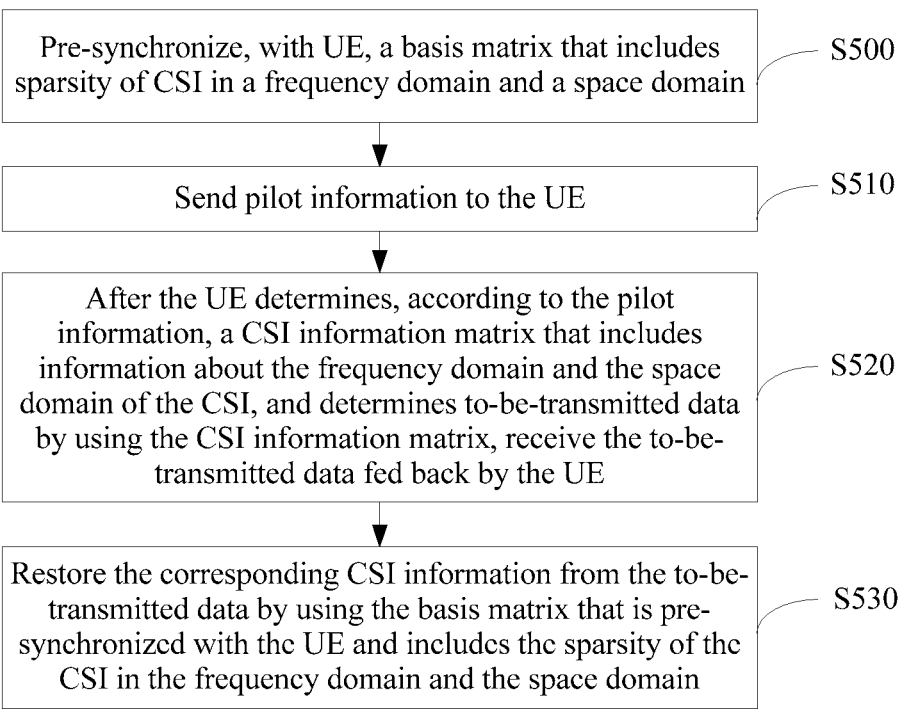
FIG. 13 is a flowchart of a channel state information feedback method according to yet another embodiment of the present invention.

FIG. 13 is yet another flowchart of a channel state information feedback method according to an embodiment of the present invention. The method may be applied to a base station. Referring to FIG. 13, the method may include the following steps:

Step S500: Pre-synchronize, with UE, a basis matrix that includes sparsity of CSI in a frequency domain and a space domain.

Step S510: Send pilot information to the UE.

Step S520: After the UE determines, according to the pilot information, a CSI information matrix that includes information about the frequency domain and the space domain of CSI, and determines to-be-transmitted data by using the CSI information matrix, receive the data fed back by the UE.

Step S530: Restore the corresponding CSI information from the data by using the basis matrix that is pre-synchronized with the UE and includes the sparsity of the CSI in the frequency domain and the space domain.

It should be noted that step S500 is a step performed in advance, and after step S500 is performed once, step S510 to step S530 may be performed for multiple times.

Figure 14:
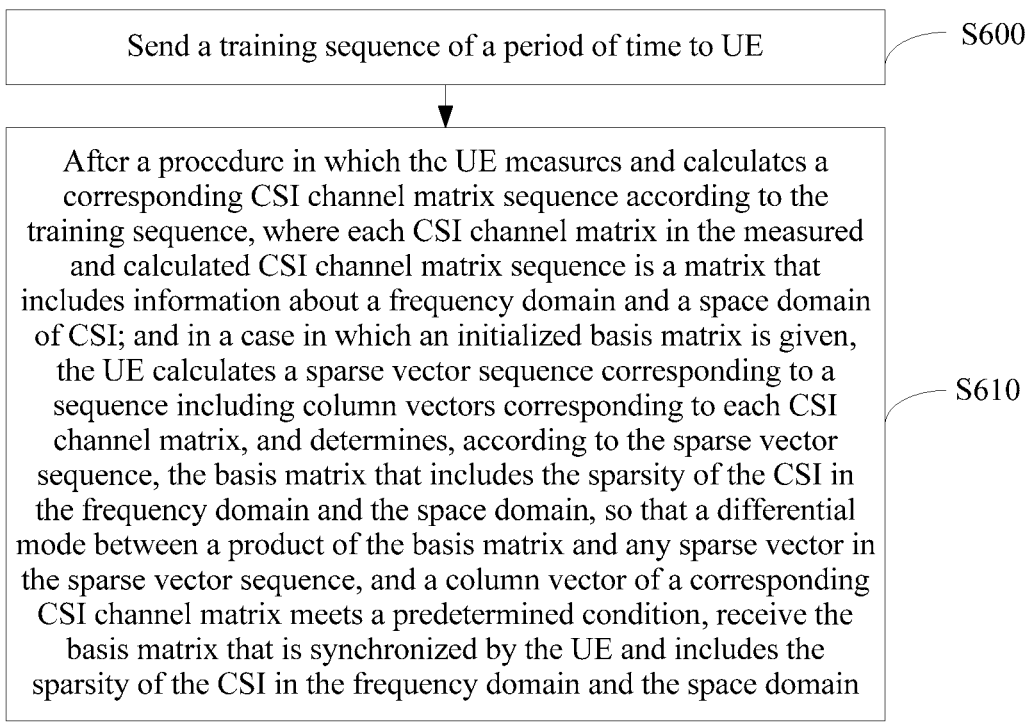
FIG. 14 is a flowchart of a method for pre-synchronizing, with UE, a basis matrix that includes sparsity of CSI in a frequency domain and a space domain according to an embodiment of the present invention.

FIG. 14 shows an optional implementation method for pre-synchronizing, with the UE, the basis matrix that includes the sparsity of the CSI in the frequency domain and the space domain. Referring to FIG. 14, the method may include the following steps:

Step S600: Send a training sequence of a period of time to the UE.

Step S610: After a procedure in which the UE measures and calculates a corresponding CSI channel matrix sequence according to the training sequence, where each CSI channel matrix in the measured and calculated CSI channel matrix sequence is a matrix that includes information about a frequency domain and a space domain of CSI; and if an initialized basis matrix is given, the UE calculates a sparse vector sequence corresponding to a sequence including column vectors corresponding to each CSI channel matrix, and determines, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition, receive the basis matrix that is synchronized by the UE and includes the sparsity of the CSI in the frequency domain and the space domain.

Optionally, the differential mode may be the smallest when the differential mode meets the predetermined condition; apparently, the predetermined condition may also be set according to an actual application situation.

For actions executed by a UE in step S610, reference may be made to the description in FIG. 2, and details are not described herein again.

Optionally, the received data fed back by the UE in step S520 shown in FIG. 13 may be data obtained after the UE performs compressive sensing processing on the CSI information matrix. Correspondingly, the restoring the corresponding CSI information from the data by using the basis matrix that is pre-synchronized with the UE and includes the sparsity of the CSI in the frequency domain and the space domain in step S530 shown in FIG. 13 may be: performing, by using the basis matrix that is pre-synchronized with the UE and includes the sparsity of the CSI in the frequency domain and the space domain, compressive sensing restoration processing on a CSI information matrix obtained after the compressive sensing processing to obtain the corresponding CSI information.

Optionally, the received data fed back by the UE in step S520 shown in FIG. 13 may be data obtained after the UE performs compressive sensing processing on the CSI information matrix, and performs block quantization on a CSI information matrix obtained after the compressive sensing processing. Correspondingly, the restoring the corresponding CSI information from the data by using the basis matrix that is pre-synchronized with the UE and includes the sparsity of the CSI in the frequency domain and the space domain in step S530 shown in FIG. 13 may be: performing, by using the basis matrix that is pre-synchronized with the user equipment UE and includes the sparsity of the CSI in the frequency domain and the space domain, compressive sensing restoration processing on a CSI information matrix obtained after the block quantization to obtain the corresponding CSI information.

In the channel state information feedback method provided in this embodiment of the present invention, a characteristic of sparsity of CSI in a frequency domain and a space domain in a large-scale antenna communications system is used, which improves CSI feedback efficiency, reduces feedback overheads from a UE to a base station, and further improves spectrum utilization in wireless communications.

The following describes a channel state information feedback apparatus provided in an embodiment of the present invention from a perspective of a base station. Mutual reference may be made between the channel state information feedback apparatus described in the following and the channel state information feedback method described in the foregoing from a perspective of a base station.

Figure 15:
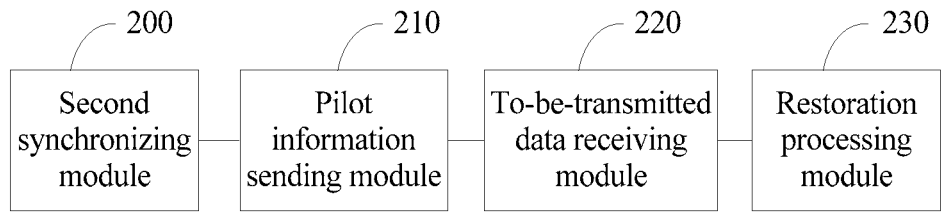
FIG. 15 is a functional block diagram of a channel state information feedback apparatus according to another embodiment of the present invention.

FIG. 15 is another structural block diagram of a channel state information feedback apparatus according to an embodiment of the present invention. The apparatus may be applied to a base station. Referring to FIG. 15, the apparatus may include:

a second synchronizing module 200, configured to pre-synchronize, with UE, a basis matrix that includes sparsity of CSI in a frequency domain and a space domain;

a pilot information sending module 210, configured to send pilot information to the UE;

a to-be-transmitted data receiving module 220, configured to: after the UE determines, according to the pilot information, a CSI information matrix that includes information about the frequency domain and the space domain of CSI, and determines data by using the CSI information matrix, receive the data fed back by the UE; and a restoration processing module 230, configured to restore the corresponding CSI information from the data by using the basis matrix that is pre-synchronized with the UE and includes the sparsity of the CSI in the frequency domain and the space domain.

Figure 16:
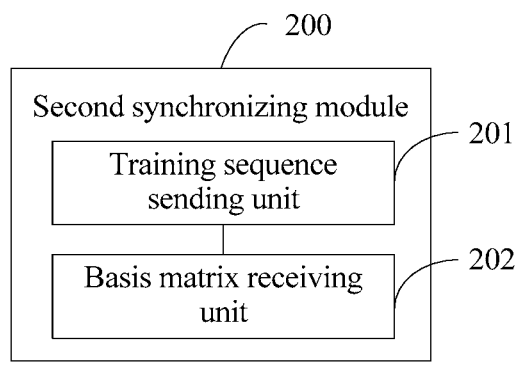
FIG. 16 is a functional block diagram of a second synchronizing module according to an embodiment of the present invention.

FIG. 16 shows an optional structure of the second synchronizing module 200. Referring to FIG. 16, the second synchronizing module 200 may include:

a training sequence sending unit 201, configured to send a training sequence of a period of time to the UE; and a basis matrix receiving unit 202, configured to: after a procedure in which the UE measures and calculates a corresponding CSI channel matrix sequence according to the training sequence, where each CSI channel matrix in the measured and calculated CSI channel matrix sequence is a matrix that includes information about a frequency domain and a space domain of CSI; and if an initialized basis matrix is given, the UE calculates a sparse vector sequence corresponding to a sequence including column vectors corresponding to each CSI channel matrix, and determines, according to the sparse vector sequence, the basis matrix that includes the sparsity of the CSI in the frequency domain and the space domain, so that a differential mode between a product of the basis matrix and any sparse vector in the sparse vector sequence, and a column vector of a corresponding CSI channel matrix meets a predetermined condition, receive the basis matrix that is synchronized by the UE and includes the sparsity of the CSI in the frequency domain and the space domain.

Optionally, the differential mode may be the smallest when the differential mode meets the predetermined condition; apparently, the predetermined condition may also be set according to an actual application situation.

Figure 17:
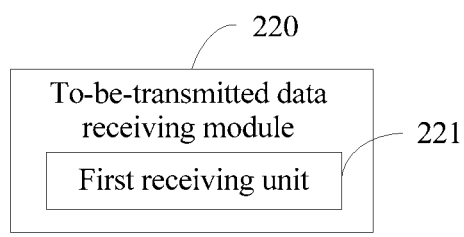
FIG. 17 is a functional block diagram of a data receiving module according to an embodiment of the present invention.

Optionally, the data may be obtained after the UE performs compressive sensing processing on the CSI information matrix. Correspondingly, FIG. 17 shows an optional structure of the to-be-transmitted data receiving module 220. Referring to FIG. 17, the to-be-transmitted data receiving module 220 may include:

a first receiving unit 221, configured to: after the UE determines, according to the pilot information, the CSI information matrix that includes the information about the frequency domain and the space domain of CSI, and performs the compressive sensing processing on the CSI information matrix, receive a CSI information matrix that is fed back by the UE and is obtained after the compressive sensing processing.

Figure 18:
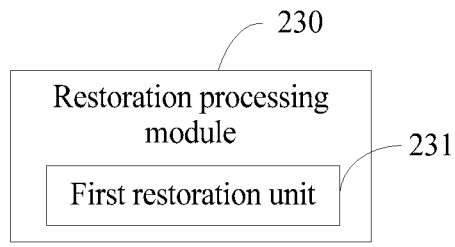
FIG. 18 is a functional block diagram of a restoration processing module according to an embodiment of the present invention.

Correspondingly, FIG. 18 shows an optional structure of the restoration processing module 230. Referring to FIG. 18, the restoration processing module 230 may include:

a first restoration unit 231, configured to perform, by using the basis matrix that is pre-synchronized with the UE and includes the sparsity of the CSI in the frequency domain and the space domain, compressive sensing restoration processing on the CSI information matrix obtained after the compressive sensing processing to obtain the corresponding CSI information.

Figure 19:
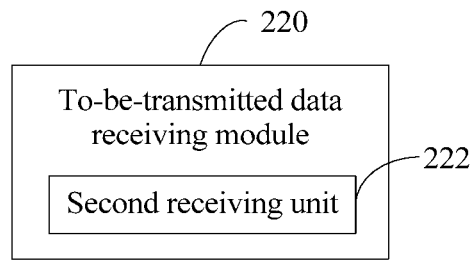
FIG. 19 is a functional block diagram of a data receiving module according to another embodiment of the present invention.

Optionally, the data may be obtained after the UE performs compressive sensing processing on the CSI information matrix, and performs block quantization on a CSI information matrix obtained after the compressive sensing processing. Correspondingly, FIG. 19 shows another optional structure of the to-be-transmitted data receiving module 220. Referring to FIG. 19, the to-be-transmitted data receiving module 220 may include:

a second receiving unit 222, configured to: after the UE determines, according to the pilot information, the CSI information matrix that includes the information about the frequency domain and the space domain of CSI, performs the compressive sensing processing on the CSI information matrix, and performs the block quantization on the CSI information matrix obtained after the compressive sensing processing, receive a CSI information matrix that is obtained after the block quantization and is fed back by the UE.

Figure 20:
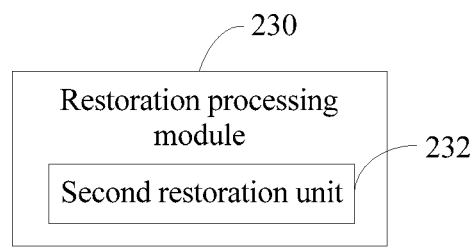
FIG. 20 is a functional block diagram of a restoration processing module according to another embodiment of the present invention.

Correspondingly, FIG. 20 shows another optional structure of the restoration processing module 230. Referring to FIG. 20, the restoration processing module 230 may include:

a second restoration unit 232, configured to perform, by using the basis matrix that is pre-synchronized with the UE and includes the sparsity of the CSI in the frequency domain and the space domain, compressive sensing restoration processing on the CSI information matrix obtained after the block quantization to obtain the corresponding CSI information.

In the channel state information feedback apparatus provided in this embodiment of the present invention, a characteristic of sparsity of CSI in a frequency domain and a space domain in a large-scale antenna communications system is used, which improves CSI feedback efficiency, reduces feedback overheads from a UE to a base station, and further improves spectrum utilization in wireless communications.

An embodiment of the present invention further provides a base station, where the base station may include the foregoing channel state information feedback apparatus described from a perspective of a base station. For descriptions about the channel state information feedback apparatus, reference may be made to the descriptions in FIG. 15 to FIG. 20, and details are not described herein again.

Figure 21:
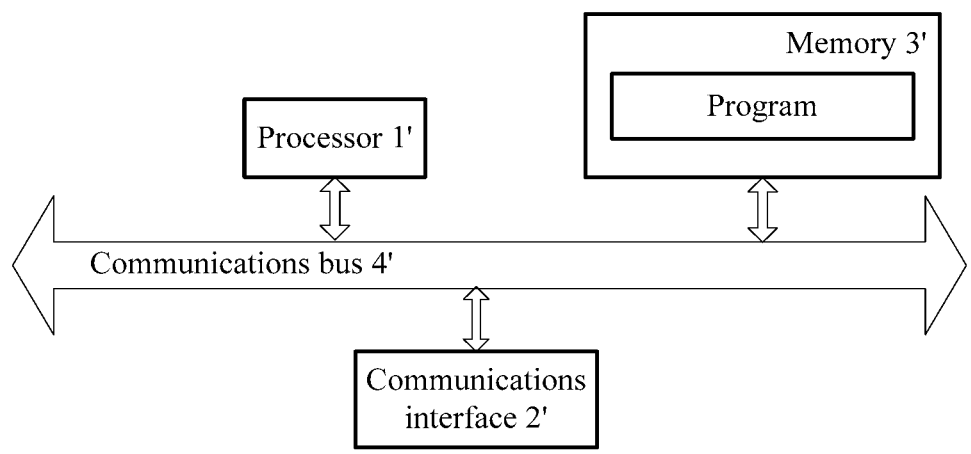
FIG. 21 is a simplified structural block diagram of a base station according to an embodiment of the present invention.

The following describes a hardware structure of a base station provided in an embodiment of the present invention. FIG. 21 shows a structural block diagram of hardware of the base station. Referring to FIG. 21, the base station may include: a processor 1', a communications interface 2', a memory 3' and a communications bus 4'.

The processor 1', the communications interface 2', and the memory 3' conduct mutual communication through the communications bus 4'.

Optionally, the communications interface 2' may be an interface of a communication module, for example, an interface of a GSM module.

The processor 1' is configured to execute a program.

The memory 3' is configured to store the program.

The program may include program code, and the program code includes a computer operation instruction.

The processor 1' may be a central processing unit (CPU), or an application-specific integrated circuit (ASIC), or one or more integrated circuits configured to implement this embodiment of the present invention.

The memory 3' may include a high-speed RAM memory, or may further include a non-volatile memory, for example, at least one disk memory.

The program may be specifically used to:

pre-synchronize, with UE, a basis matrix that includes sparsity of CSI in a frequency domain and a space domain;

send pilot information to the UE;

after the UE determines, according to the pilot information, a CSI information matrix that includes information about the frequency domain and the space domain of CSI, and determines data by using the CSI information matrix, receive the data fed back by the UE; and restore the corresponding CSI information from the data by using the basis matrix that is pre-synchronized with the UE and includes the sparsity of the CSI in the frequency domain and the space domain.

Optionally, the program may include function modules shown in FIG. 15 to FIG. 20.

The embodiments of the present specification are described in a progressive manner. The focus of each embodiment is placed on a difference from other embodiments. The same or similar parts of the embodiments can be referenced mutually. The apparatus disclosed in the embodiments is described relatively simply because it corresponds to the method disclosed in the embodiments, and for a part related to that of the method, reference may be made to the description of the method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention in the present disclosure.

In combination with the embodiments disclosed in this specification, method or algorithm steps may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a Compact Disc Read-Only Memory (CD-ROM), or a storage medium in any other forms well-known in the art.

The foregoing descriptions are merely exemplary implementation manners of embodiments of the present invention. It should be noted that a person of ordinary skill in the art may make several improvements or polishing without departing from the principle of the present invention and the improvements or polishing shall fall within the protection scope of the present invention.

What is claimed is:

1. A channel state information (CSI) feedback method for use by a terminal device, comprising:

receiving a pilot signal from a base station;

constructing, according to the pilot signal, a CSI information matrix comprising frequency domain information and space domain information of the CSI;

determining data to be transmitted to the base station by using the CSI information matrix; and transmitting the data to the base station, so that the base station restores the CSI information matrix from the data by using a basis matrix, comprising sparsity of CSI in the frequency domain and the space domain, that is pre-synchronized with the terminal device;

wherein a process for the terminal device to pre-synchronize the basis matrix with the base station comprises:

receiving, from the base station, a training sequence of a period of time;

measuring and calculating a CSI channel matrix sequence corresponding to the training sequence, wherein each CSI channel matrix in the CSI channel matrix sequence is a matrix that comprises frequency domain and space domain information of the CSI;

when an initialized basis matrix is given, calculating a sparse vector sequence corresponding to a sequence comprising column vectors corresponding to each CSI channel matrix:

determining, according to the sparse vector sequence, the basis matrix that comprises the sparsity of the CSI in the frequency domain and the space domain, so that a differential mode between a product of the basis matrix and any sparse vector in the sparse vector sequence, and a column vector of a corresponding CSI channel matrix meet predetermined conditions; and synchronizing, with the base station, the determined basis matrix.

2. The method according to claim 1, wherein determining the data to be transmitted to the base station by using the CSI information matrix comprises:

compressive sensing the CSI information matrix to obtain the data; and wherein transmitting the data to the base station comprises:

transmitting, to the base station, the data obtained by compressive sensing the CSI information matrix.

3. The method according to claim 1, wherein determining the data to be transmitted to the base station by using the CSI information matrix comprises:

compressive sensing the CSI information matrix; and block quantizing the compressive sensed CSI information matrix to obtain the data; and wherein transmitting the data to the base station comprises:

transmitting, to the base station, the data obtained by block quantizing the compressive sensed CSI information matrix.

4. The method according to claim 3, wherein block quantizing the compressive sensed CSI information matrix comprises:

dividing the compressive sensed CSI information matrix into blocks of a predetermined length; and quantizing each block of the compressive sensed CSI information matrix by using a codebook with a predetermined dimension.

5. A terminal device, comprising a processor and non-transitory computer-readable storage medium including computer-executable channel state information (CSI) feedback instructions executed by the processor to perform operations comprising:

receiving a pilot signal from a base station;

constructing, according to the pilot signal, a CSI information matrix comprising frequency domain information and space domain information of the CSI;

determining data to be transmitted to the base station by using the CSI information matrix;

transmitting the data to the base station, so that the base station restores the CSI information matrix from the data by using a basis matrix that is pre-synchronized with the terminal device, wherein the basis matrix comprises sparsity of CSI in the frequency domain and the space domain; receiving a training sequence of a period of time, sent by the base station;

measuring and calculating a corresponding CSI channel matrix sequence corresponding to the training sequence, wherein each CSI channel matrix in the CSI channel matrix sequence is a matrix that comprises frequency domain and space domain information of the CSI;

when an initialized basis matrix is given, calculating a sparse vector sequence corresponding to a sequence comprising column vectors corresponding to each CSI channel matrix:

determining, according to the sparse vector sequence, the basis matrix that comprises the sparsity of the CSI in the frequency domain and the space domain, so that a differential mode between a product of the basis matrix and any sparse vector in the sparse vector sequence, and a column vector of a corresponding CSI channel matrix meets a predetermined condition; and synchronizing, to the base station, the determined basis matrix.

6. The terminal device according to claim 5, wherein the operations further comprise:

compressive sensing on the CSI information matrix to obtain the data; and transmitting, to the base station, the data obtained by compressive sensing the CSI information matrix.

7. The terminal device according to claim 5, wherein the operations further comprise:

performing compressive sense processing on the CSI information matrix; and performing block quantization on a CSI information matrix obtained from the compressive sensing processing to obtain the data; and transmitting, to the base station, the data obtained by block quantizing the compressive sensed CSI information matrix.

8. The terminal device according to claim 7, wherein the operations further comprise:

dividing the compressive sensed CSI information matrix into blocks of a predetermined length; and quantizing each block of the compressive sensed CSI information matrix by using a codebook with a predetermined dimension.

9. A channel state information (CSI) feedback method for use by a base station, comprising:

sending a pilot signal to a terminal device;

receiving data from the terminal device;

restoring a CSI information matrix from the received data by using a basis matrix, comprising sparsity of CSI in the frequency domain and the space domain, that is pre-synchronized with the terminal device; and obtaining frequency domain information and space domain information of the CSI from the restored CSI information matrix;

wherein a first process for the base station to pre-synchronize the basis matrix with the terminal device comprises:

sending a training sequence of a period of time to the terminal device; and receiving the basis matrix determined by the terminal device, so as to synchronize the basis matrix with the terminal device, wherein the basis matrix is determined by the terminal device by a second process that comprises:

measuring and calculating a CSI channel matrix sequence corresponding to the training sequence, wherein each CSI channel matrix in the CSI channel matrix sequence is a matrix that comprises frequency domain and space domain information of the CSI;

when an initialized basis matrix is given, calculating a sparse vector sequence corresponding to a sequence comprising column vectors corresponding to each CSI channel matrix:

determining, according to the sparse vector sequence, the basis matrix that comprises the sparsity of the CSI in the frequency domain and the space domain, so that a differential mode between a product of the basis matrix and any sparse vector in the sparse vector sequence, and a column vector of a corresponding CSI channel matrix meet predetermined conditions.

10. A base station, comprising a processor, and a non-transitory computer-readable storage medium including computer-executable channel state information (CSI) acquisition instructions executed by the processor to perform operations comprising:

sending a pilot signal to a terminal device;

receiving data from the terminal device;

restoring a CSI information matrix from the received data by using a basis matrix, comprising sparsity of CSI in the frequency domain and the space domain, that is pre-synchronized with the terminal device;

obtaining frequency domain information and space domain information of the CSI from the restored CSI information matrix;

sending a training sequence of a period of time to the UE; and receiving the basis matrix determined by the terminal device, so as to synchronize the basis matrix with the terminal device, wherein the basis matrix is determined by the terminal device by a process that comprises:

measuring and calculating a CSI channel matrix sequence corresponding to the training sequence, wherein each CSI channel matrix in the CSI channel matrix sequence is a matrix that comprises frequency domain and space domain information of the CSI;

when an initialized basis matrix is given, calculate a sparse vector sequence corresponding to a sequence comprising column vectors corresponding to each CSI channel matrix:

determining, according to the sparse vector sequence, the basis matrix that comprises the sparsity of the CSI in the frequency domain and the space domain, so that a differential mode between a product of the basis matrix and any sparse vector in the sparse vector sequence, and a column vector of a corresponding CSI channel matrix meet predetermined conditions.

* * * * *